Figure 1:
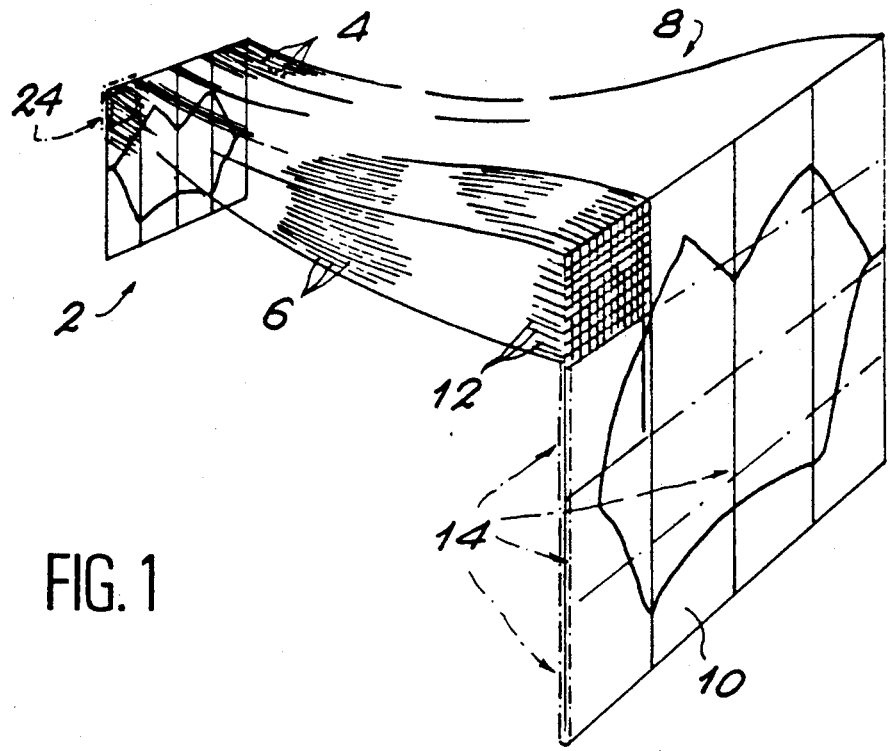

United States Patent [19]

Chazalon et al.

[11] Patent Number: 5,160,565
[45] Date of Patent: Nov. 3, 1992

[54] PROCESS FOR THE PRODUCTION OF AN IMAGE INTENSIFIER MODULE FOR OPTICAL FIBRE ILLUMINATED SIGNS

[75] Inventors: Michel Chazalon, Maurepas; Didier Gauthereau, Vernouillet; Patrice Micolon, Viroflay; Serge Palanque, Les Ulis, all of France

[73] Assignee: Commissariat a l'Energie Atomique, Paris, France

[21] Appl. No.: 602,484

[22] Filed: Oct. 24, 1990

[30] Foreign Application Priority Data

Oct. 26, 1989 [FR] France ................... 89 14043

[51] Int. Cl.⁵ .............. F21V 8/00; F21V 17/04; B29D 11/00
[52] U.S. Cl. .................... 156/242; 40/547; 156/296; 264/1.5; 362/32; 385/120
[58] Field of Search ........... 156/166, 296, 293, 242; 350/96.25, 96.27, 96.24; 40/547; 362/32; 385/120, 121; 264/1.5, 2.7

[56] References Cited

U.S. PATENT DOCUMENTS

| | | | |
|---|---|---|---|
| 3,815,986 | 6/1974 | Darbee | 350/96.27 X |
| 3,849,219 | 11/1974 | Hall-Jackson | 156/296 X |
| 3,909,109 | 9/1975 | Aurenz | 350/96.25 |
| 4,780,798 | 10/1988 | Iida | 362/32 |
| 4,814,948 | 3/1989 | Hasegawa | 362/32 |
| 5,040,320 | 8/1991 | Reidinger | 40/547 X |

FOREIGN PATENT DOCUMENTS

| | | | |
|---|---|---|---|
| 0275061 | 7/1988 | European Pat. Off. | 350/96.25 |
| 312267 | 4/1989 | European Pat. Off. | |
| 324147 | 7/1989 | European Pat. Off. | |
| 330590 | 8/1989 | European Pat. Off. | |
| 2523496 | 12/1976 | Fed. Rep. of Germany | 350/96.24 |
| 3812418 | 10/1989 | Fed. Rep. of Germany | 350/96.24 |
| 2488709 | 2/1982 | France | 350/96.24 |
| 2517445 | 6/1983 | France | 350/96.27 |
| 2530850 | 1/1984 | France | 350/96.24 |
| 56-83705 | 7/1981 | Japan | 350/96.24 |
| 64-11205 | 1/1989 | Japan | 350/96.25 |
| 1-233478 | 9/1989 | Japan | 40/547 |
| 1-281408 | 11/1989 | Japan | 350/96.24 |
| 1380899 | 1/1975 | United Kingdom | 350/96.24 |

*Primary Examiner*—Michael W. Ball
*Assistant Examiner*—Adrienne C. Johnstone
*Attorney, Agent, or Firm*—Michael N. Meller

[57] ABSTRACT

The invention makes it possible to construct large screens by associating several image intensifier modules.

A module comprises an input face (2) receiving the image to be intensified, an output face (10) reconstituting the intensified image and a bundle (8) of optical fibres.

The process according to the invention consists of producing bands (16) of optical fibres, each band corresponding to a line or row of the image and collectively put into place the non-contiguous ends (12) of the output face in a matrix output support (14). The latter can be obtained either by moulding, or by constructing beforehand injection moulded strips, which are then introduced into a grid or grating.

8 Claims, 4 Drawing Sheets

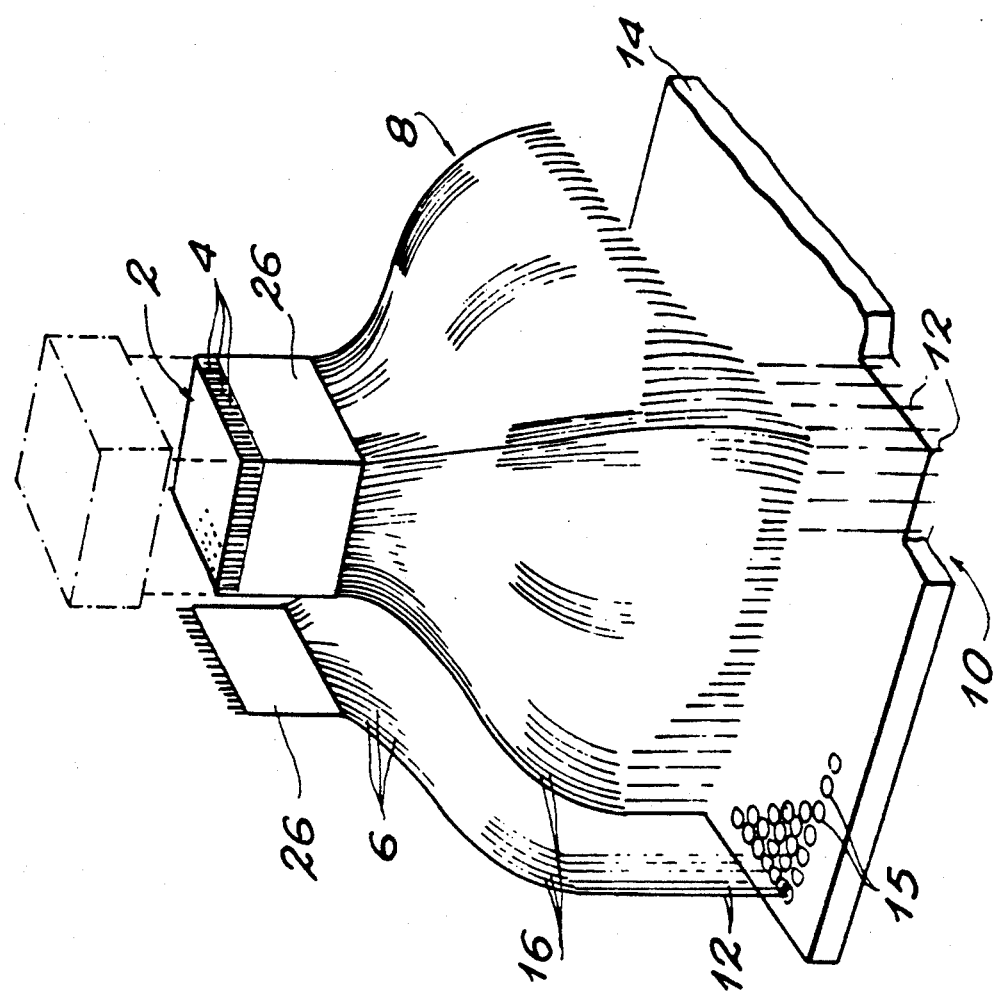
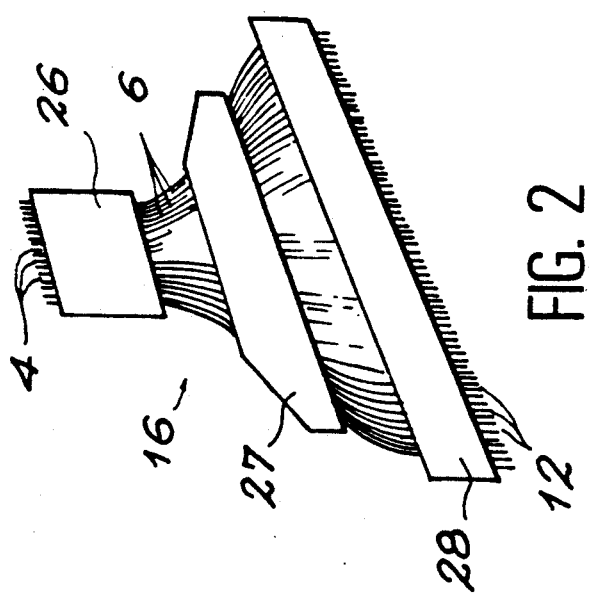
FIG. 2
FIG. 3

PROCESS FOR THE PRODUCTION OF AN IMAGE INTENSIFIER MODULE FOR OPTICAL FIBRE ILLUMINATED SIGNS

DESCRIPTION

The invention relates to a process for the production of an image intensifier module for constituting with other such modules a large screen, such as a liquid crystal, optical fibre illuminated sign.

Several types of large screens for displaying animated colour images intended for equipping open-air public meeting points, such as stadiums, horse racing tracks and business and shopping centres are known.

A first large screen type is the video projector system, which formed a wall of pictures. This wall is constituted by a plurality of video monitors. Such systems are difficult to use in the open-air, due to their inadequate brightness, so that the total image or picture displayed is not seen clearly by the spectators.

With regards to panels or signs formed from light emitting diodes, they do not cover the complete spectrum of colours. Thus, there is no diode emitting in the blue.

Another type of animated large screen consists of displaying a plurality of colour pixels. These large screens are constituted either by a plurality of small cathode ray tubes, or a plurality of filament lamps. This large screen type has a poor granularity, i.e. pixels separated by several centimetres. Moreover, it requires a very high power consumption, a large infrastructure and very high costs.

Finally, a large screen type is known, which uses optical fibre colour display devices. The display surface of each of the devices is constituted by one of the ends of a bundle of optical fibres. The other bundle end is positioned facing an array of light modulators, e.g. using liquid crystals. This is preceded by coloured beam generators, other means being provided for controlling the passage and colour of the light penetrating each of the fibres. This image intensifier type is perfectly contiguous with its adjacent intensifiers and defines therewith a continuous large image or picture. The structure of an image intensifier of this type, whose display surface exceeds 1 $m^2$, requires a very large number of optical fibres. It is very difficult to produce such an image intensifier due to the assembly and fixing of each of these fibres.

The object of the present invention is to propose a process for the production of such an image intensifier permitting relatively rapid production.

The invention therefore relates to a process for the production of an image intensifier module for optical fibre illuminated signs comprising an input face for receiving the image to be intensified and constituted by first ends of optical fibres of a bundle, said first ends being contiguous; said optical fibre bundle; and an output face for reconstituting the intensified image and formed by the second ends of the optical fibres of the bundle, said second ends being non-contiguous and fixed to a matrix output support, characterized by forming bands of optical fibres, whose first contiguous fibre ends of the same band form a line of the image to be intensified and whose second ends of said same fibres form the corresponding line of the intensified image and collectively placing the second non-contiguous ends in the matrix output support positioning each second end in its final position.

The first and second ends of the fibres of the same band are preferably maintained in place by attachments constituted by an optionally aluminium reinforced adhesive support.

According to a first embodiment of the process, the output face is obtained from a mould by the stages of putting the second ends in the mould, moulding a first resin of the assembly constituted by the second ends and the mould, polymerizing said first resin and demoulding the matrix output support formed from the first polymerized resin and in which are embedded the second ends.

Following the complete insertion of the fibres into the matrix output support, it is preferable to machine the surface where the fibres issue in order to form a planar output surface.

Preferably the resin is an epoxy resin.

According to said first variant, the mould is preferably produced from a perforated metal plate in which are inserted fingers materializing the second non-contiguous ends of the output face and the volume of the assembly defined by the fingers is closed by a mould body within which is injected a second resin, preferably a flexible silicone resin.

In the second embodiment of the process according to the invention, the matrix output support is constituted by transparent strips, which are injection moulded and fixed to a grid or grating, each strip corresponding to a band and having holes corresponding to the second ends of said band.

In this case, the process consists of successively immersing the second ends in a resin, collectively introducing the second ends into the holes of the strip, polymerizing the resin and fixing each strip to the grid.

According to this second embodiment, the grid is preferably black.

According to an aspect of the second embodiment, the strips are made from a transparent thermoplastic material.

Each strip can be formed from several blocks interconnected by connecting members and in each of which is inserted a second optical fibre end, by means of an inlet cone extended by a cylindrical duct, said blocks having in their lower portion light ray refraction means.

According to the invention and for the input face, the process consists of bonding the first contiguous ends of the input face to the resin, polymerizing the resin and machining the input face by a levelling process.

The invention is described in greater detail hereinafter relative to non-limitative embodiments and the attached drawings, wherein show:

FIG. 1 a large screen obtained with the aid of several modules produced by the process according to the invention.

FIG. 2 an optical fibre band symbolizing an intermediate stage of the process according to the invention.

FIG. 3 the putting into place of the bands to form the module.

FIGS. 4A, 4B, 4C and 4D, in section, the different phases of producing the output face in the inventive process.

Figure 5:
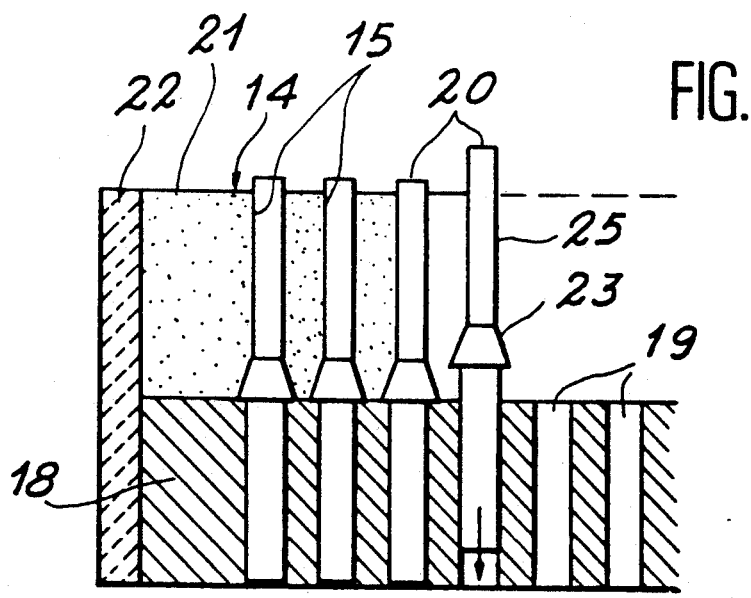

FIG. 5 in partial section, the counter-mould and fingers used in a preferred variant of the first embodiment of the process according to the invention.

Figure 6:
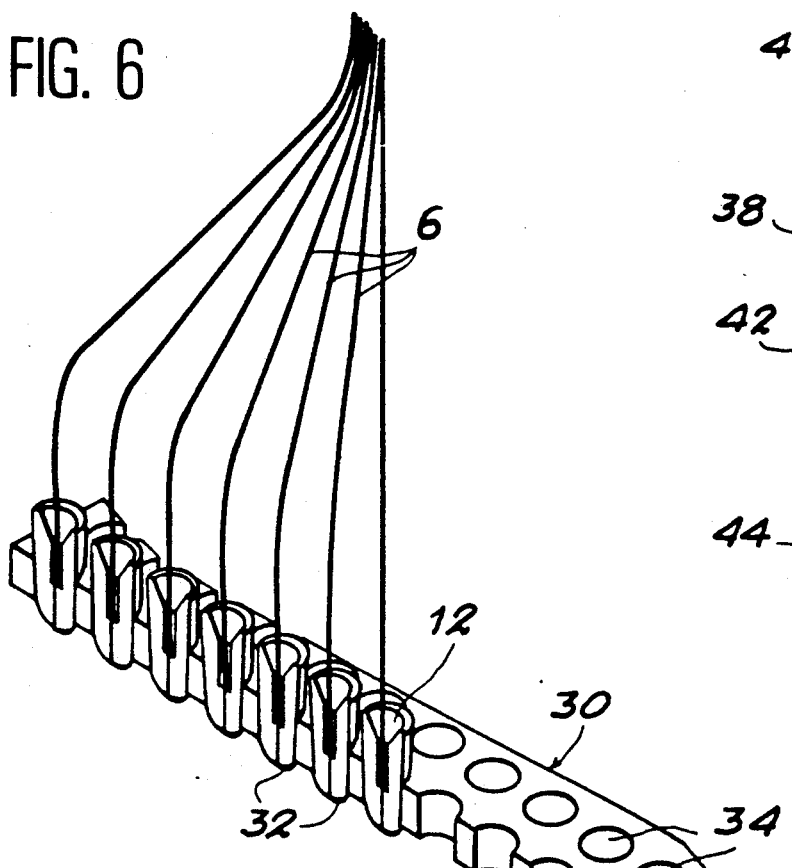

FIG. 6 the second embodiment of the process according to the invention.

Figure 7:
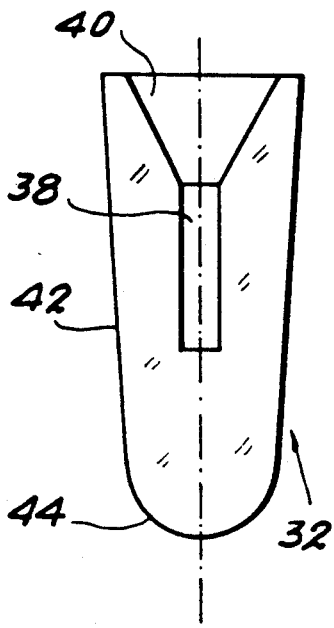

FIG. 7 in vertical section, a block used in said second embodiment.

Figure 8:
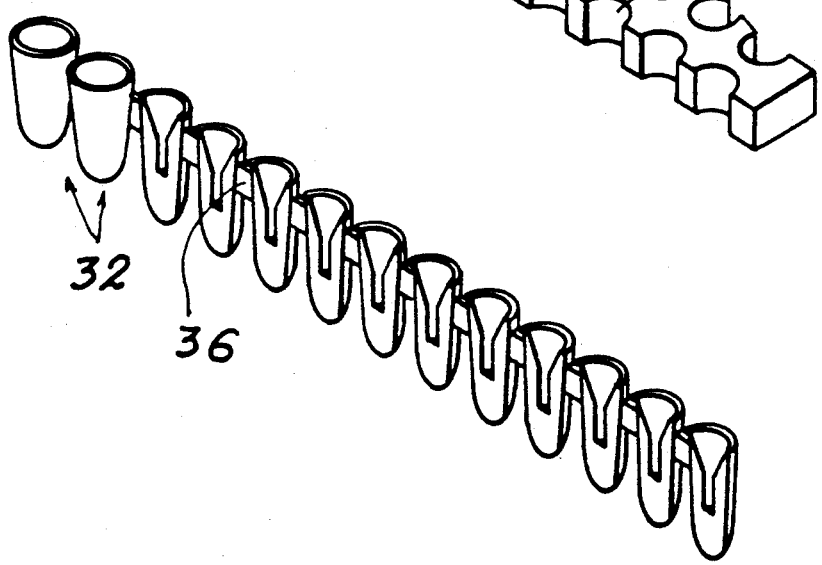

FIG. 8 in longitudinal section, a row of blocks, like that shown in FIG. 7.

With reference to FIG. 1, a large screen or illuminate sign can be constructed with several image intensifier modules obtained by the process according to the invention. It is therefore possible to obtain an illuminated sign of several square metres by stacking square or rectangular intensifier modules.

The image intensifier module obtained by the process according to the invention is mainly constituted by a bundle 8 of optical fibres 6. At the input face 2 of the bundle 8, the fibres 6 are contiguous, i.e. they are engaged with one another. They are assembled so as to define an input face 2, whose shape corresponds to the image to be intensified. In the case shown, said shape is rectangular with a long side slightly longer than the small side. In order to form a magnified output image, the output face 10 is much larger than the input face 2. To obtain such an intensification, the bundle 8 of fibres 6 widens when said fibres 6 approach the output face 10. In order to reconstitute the image received by the input face 2, the second end 12 of each fibre abuts on the output face 10 at a point corresponding to the same point of the image of the input face 2 and to which is fixed the first fibre end 4. On the output face 10 the second fibre ends 12 are consequently more widely spaced.

Each of the first ends 4 is connected to a colour display modulator 24, e.g. of the liquid crystal type. Each modulator 24 belongs to a light modulating matrix. The light supplied by each of the modulators 24 is such that the image reconstituted by the assembly of said modulators 24 can be seen in a satisfactory manner on the output face 10 by an observer, the module being located in the open-air.

With reference to FIGS. 2 and 3, the production process for an image intensifier module according to the invention consists of producing bands 16 of optical fibres 6. Each band 16 corresponds to a row or column of the intensified image. The first contiguous ends 4 of the fibres 6 are connected in engaging manner to form a row. They are kept fixed preferably by an intake attachment 26, which surrounds the first ends 4. In order to respect the widened or flared shape of the bundle of fibres, each fibre is spaced from the others so as to form a row of outputs constituted by second ends 12 joined in non-contiguous manner, which are regularly spaced from one another and correspond to the locations of the first corresponding ends 4.

Each first attachment 26 is constituted by an adhesive film. The latter is optionally reinforced by a thin metal foil, e.g. of aluminium. This makes it possible to keep the first fibre ends 4 in a correct alignment.

FIG. 2 shows at mid-length of the fibre, a second attachment 27 keeping the fibres in position during the production of the bundle. Thus, said second attachment 27 can be removed once the band has been formed.

The output face, constituted by second ends 12, is maintained in place in an identical manner to the input face with the aid of a third attachment 28. It is also constituted by an industrial adhesive, which is optionally reinforced by a metal ribbon, preferably of aluminium. The alignment and spacing of the second ends 12 of the fibres 6 are therefore ensured.

Once formed, the bands of optical fibres are assembled on a matrix output support 14. According to the invention they are collectively put into place, each non-contiguous second end 12 of the bundle being inserted in a hole 15 of the matrix output support 14. Therefore each second end 12 is maintained in its final position. The fixing of a fibre 6 in the matrix output support 14 can, according to the invention, take place in two different ways.

According to the first embodiment of the inventive process, the output face 10 and therefore the output matrix support 14 is obtained from a mould and the process then comprises the following stages.

Figure 4:
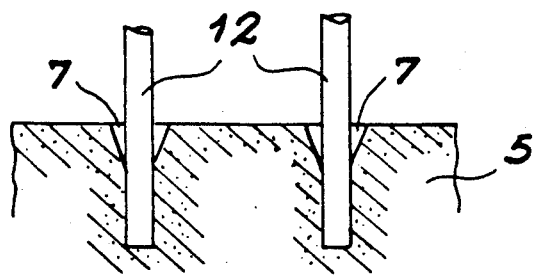
Figure 4:
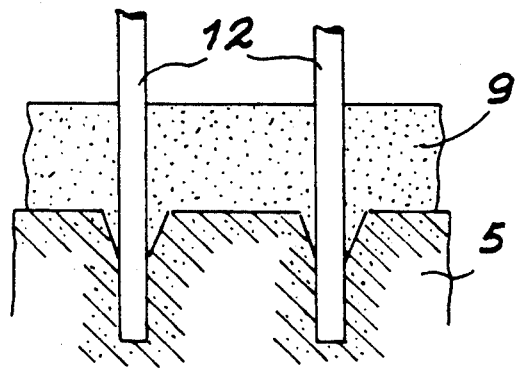
Figure 4:
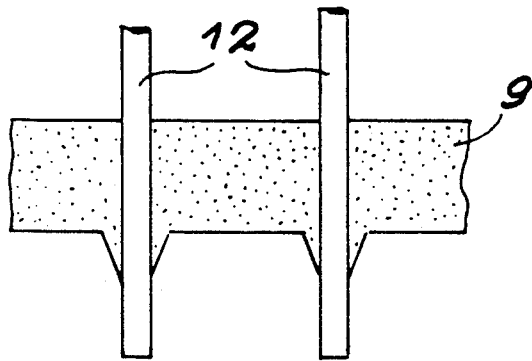
Figure 4:
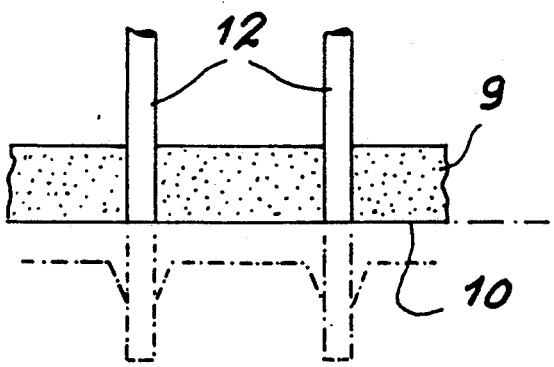

As shown in FIG. 4A, the first stage consists of putting into place the second ends 12 of the bands 16 in a mould 5. To this end, the mould 5 has holes widened at their outlet 7 and serving to receive in each case a second end 12 of a fibre 6.

With reference to FIG. 4B, the second stage consists of pouring a first resin 9 on to the assembly constituted by the mould 5 and the second ends 12. Thus, said resin 9 covers the entire upper surface of the mould 5 and penetrates the flared outlet 7 surrounding in each case a second end 12. Preferably, said first resin is an epoxy resin.

The third stage consists of polymerizing the first resin. The object of this operation is to fix the second ends 12 in their final position in said resin 9.

As shown in FIG. 4C, the following stage consists of demoulding the matrix output support 14 formed by the first polymerized resin in which are embedded the second ends 12.

Once inserted in the output support 14, the fibres 6 project beyond the same. In order to form a planar output surface, it is necessary to machine said face in such a way as to bring the end of the fibres level with the output surface. This levelling can be carried out by milling (FIG. 4D).

One aspect of the invention consists of facilitating demoulding in the manner shown in FIG. 4C. For this purpose a relatively elastic mould is sought. Therefore, the production of the mould 5 takes place with the aid of a counter-mould. FIG. 5 shows the counter-mould formed by a rigid base plate 18, in which are formed holes 19. The latter need not necessarily be through holes, as shown in FIG. 5. They receive the fingers 20. The base plate 18 is surrounded by side walls 22, constituting the counter-mould body and whose height exceeds the thickness of the base plate 18. These three types of parts 18, 20, 22 define a volume 21 above the plate 18, in which can be poured a second resin, surrounding in this way each finger 20. Each of the latter has a conical portion 23, so as to define a translation abutment when the finger 20 is inserted in the base plate 18.

This conical portion 23 will also define a conical counterpart in the second resin, which will then form a means for facilitating the introduction of fibres into the mould 5 constituted by the second resin.

The resin is polymerized to obtain the mould 5. The thus formed mould 5 is then demoulded, i.e. detached from the base plate 18 and the side walls 22. In order to facilitate handling of the mould during demoulding, the second resin is preferably a flexible silicone resin.

When the mould 5 is finished, each band 16 of optical fibres can then be introduced. The conical counterpart of each hole 15 formed in the output support 14 then facilitates the introduction of the optical fibres into the said holes 15.

The production process according to the invention permits a second output face design with a different matrix support. With reference to FIG. 6, the output face is mainly constituted by optical blocks or systems 32, in which are inserted the optical fibres 6, as well as a grid or grating 30 for receiving the optical blocks 32.

With reference to FIG. 7, each optical block 32 is constituted by a conical portion shaped like a finger and made from transparent material, such as a thermosetting material, e.g. plexiglass. It has a longitudinal hole. At its inlet, the latter has a conical shape 40, which is extended by a cylindrical shape 38 for receiving the optical fibre.

By associating a number of optical blocks 32 corresponding to the number of points of a line or row of the image to be intensified, it is possible form a strip corresponding to a band, like that designated 16 in FIGS. 2 and 3. As is shown in FIG. 8, the optical blocks 32 can be interconnected by connecting members 36. Each strip formed in this way can be obtained by moulding a thermoplastic or transparent thermosetting material.

The grid 30 is preferably made from a black plastics material. It has a number of holes 34 corresponding to the number of optical blocks 32 to be received. The holes 34 have a diameter corresponding to the average external diameter of the optical blocks 32, so as to secure the latter by jamming or optionally by bonding. Each hole 34 is made at the location of the image to be intensified. Their spacing corresponds to the spacing of the non-contiguous ends 12 of the band 16 shown in FIG. 2.

The lower portion of each optical block comprises means for refracting the light rays transported by each optical fibre in precise directions as a function of the use, e.g. in a large solid angle. These means 44 can be constituted by a plurality of facets.

In order to construct the output face described hereinbefore, the inventive process firstly consists of immersing each of the second ends of the optical fibres into a tank containing the resin. The latter can be transparent epoxy resin or resin polymerizable with ultraviolet rays. The optical fibres are associated in band form in the manner shown in FIG. 2, each band being associated with a strip. Thus, each optical fibre end 12 is introduced into an optical block 32, said operation being facilitated by the conical portion 40 of the hole of the optical block 32. The resin drop located at said optical fibre end 12 fills the space between the optical fibre and the cylindrical portion 38 of the optical block 32.

The said resin can be polymerized in time or by excitation using ultraviolet rays, if this is allowed by the nature and thickness traversed of the material constituting the strip.

Each strip formed in this way from a row of optical blocks 32 associated with an optical fibre band is then introduced into the grid 30. The spacing between each optical block 32 corresponds to the spacing between each hole 34 in the grid 30. The latter operation can be performed in an automated manner.

This second output matrix design has the following advantages. The optical blocks 32 make it possible to broaden the field of vision without losing light by diffusion, bearing in mind the fact that the output faces are polished and that the resin used can be transparent for ensuring optical continuity. Each optical fibre is perfectly centred in its optical block 32. If the grid 30 of the output matrix is black, a good contrast is obtained relative to the output image. There is no need to machine the output face.

Finally, the resin volume used in this design is significantly reduced which makes it possible to avoid a dead time during production due to the polymerization cycles. This also avoids any deterioration in the performance characteristics of the intensifier due to the significant exothermy resulting from said cycle.

To obtain the input face 2 in FIG. 1, it is possible to bond the first contiguous ends 4 with resin, which is then polymerized. The thus obtained input face 2 can be machined by a levelling process.

We claim:

1. Process for the production of an image intensifier module for optical fibre illuminated signs comprising an input face (2) for receiving the image to be intensified and constituted by first ends (4) of optical fibres (6) of a bundle (8), said first ends (4) being contiguous; said optical fibre bundle (8); and an output (10) for reconstituting the intensified image and formed by the second ends (12) of the optical fibres (6) of the bundle (8), said second ends (12) being non-contiguous and fixed to a matrix output support (14), said process characterized by:
   (a) forming bands (16) of optical fibres (6), whose first contiguous fibre ends (4) of the same band (16) form a line of the image to be intensified and whose second ends (12) of said same fibres (6) form the corresponding line of the intensified image;
   b) collectively placing the second non-contiguous ends (12) in the matrix output support (14) positioning each second end (12) in its final position, wherein the matrix output support (14) is constituted by transparent strips which are injection molded, each strip corresponding to a band (16) and each strip having several optical blocks (32), each block having a hole (34) corresponding to a second end (12) of an optical fibre (6) in said band; and
   c) fixing the optical blocks (32) of each strip of the matrix output support (14) to a corresponding number of holes in a grid (30).

2. Process according to claim 1, characterized in that the first and second ends (4,12) of the fibre (6) of the same band (16) are secured by an inlet attachment (26) and an outlet attachment (28), each constituted by adhesive an support.

3. Process according to claim 2, characterized in that the adhesive support is reinforced with a thin aluminium foil.

4. Process according to claim 1, wherein said collectively placing the second non-contiguous ends (12) in the matrix output support (14) includes the successive steps of immersing said second ends (12) in a resin, collectively introducing the second ends (12) into said holes (34) of said optical blocks (32), and polymerizing the resin.

5. Process according to claim 1, further comprising that said grid (30) is black.

6. Process according to claim 1, further comprising that said strips are made from a transparent thermoplastic material.

7. Process according to claim 1, further comprising that said optical blocks (32) in each strip are interconnected by connecting elements (36), each optical block having an inlet cone (40), extended by a duct (38), for receiving a second end (12) of an optical fibre (6) and having means in its lower portion for refracting light rays.

8. Process according to claim 1, further comprising that said input face (2) is made by bonding the first contiguous ends (4) of the input face (2) with resin, polymerizing the resin, and machining the input face (2) by a leveling process.

* * * * *